(12) United States Patent
Chen et al.

(10) Patent No.: US 9,018,796 B2
(45) Date of Patent: Apr. 28, 2015

(54) ENERGY CONVERSION SYSTEM FOR A VEHICLE

(75) Inventors: Chingchi Chen, Ann Arbor, MI (US); Michael Degner, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 35 days.

(21) Appl. No.: 13/484,679

(22) Filed: May 31, 2012

(65) Prior Publication Data
US 2012/0235476 A1 Sep. 20, 2012

Related U.S. Application Data

(62) Division of application No. 11/537,083, filed on Sep. 29, 2006, now Pat. No. 8,232,669.

(51) Int. Cl.
*H02J 1/10* (2006.01)
*B60L 11/18* (2006.01)

(52) U.S. Cl.
CPC .............. *B60L 11/1881* (2013.01); *Y02T 90/34* (2013.01); *B60Y 2400/114* (2013.01)

(58) Field of Classification Search
USPC ........................................ 307/19, 17, 28, 151
See application file for complete search history.

(56) References Cited

U.S. PATENT DOCUMENTS

| | | | |
|---|---|---|---|
| 3,655,991 A | 4/1972 | Schneider | |
| 3,916,286 A | 10/1975 | Waehner | |
| 4,607,319 A | 8/1986 | Assow et al. | |
| 4,745,538 A * | 5/1988 | Cross et al. | ..................... 363/15 |
| 5,131,376 A | 7/1992 | Ward et al. | |
| 5,598,325 A | 1/1997 | Pleitz | |
| 5,796,241 A | 8/1998 | Otake | |
| 5,889,384 A | 3/1999 | Hayes et al. | |
| 6,008,998 A * | 12/1999 | Han | ............................... 363/16 |
| 6,252,781 B1 | 6/2001 | Rinne et al. | |
| 6,370,050 B1 | 4/2002 | Peng et al. | |
| 7,227,277 B2 * | 6/2007 | Chapman et al. | ............... 307/43 |
| 7,408,794 B2 | 8/2008 | Su | |
| 2006/0175901 A1 | 8/2006 | Murakami et al. | |

* cited by examiner

*Primary Examiner* — Daniel Cavallari
(74) *Attorney, Agent, or Firm* — David B. Kelley; Brooks Kushman P.C.

(57) ABSTRACT

An energy conversion system transfers energy between an energy source, or storage unit, and an electric device via a first port and a second port and at least one of receives and provides energy via a third port.

9 Claims, 6 Drawing Sheets

ENERGY CONVERSION SYSTEM FOR A VEHICLE

CROSS-REFERENCE TO RELATED APPLICATION

This application is a divisional of application Ser. No. 11/537,083, filed Sep. 29, 2006, now U.S. Pat. No. 8,232,669, which is hereby incorporated by reference in its entirety.

BACKGROUND OF THE INVENTION

1. Field of the Invention

The invention relates to energy conversion systems for vehicles.

2. Background Discussion

Direct current to direct current (DC/DC) buck, boost, or bi-directional converters may transfer energy between an energy source, or storage unit, e.g., a high-voltage battery, via a first port at a first voltage and an electric device, e.g., motor drive, via a second port at a second voltage higher than the first voltage.

A vehicle system may require energy to be transferred between several energy storage units and electric devices at differing voltages. Several DC/DC converters may be necessary to facilitate such energy transfer.

An energy conversion system is desired that can facilitate the transfer of energy between one or more energy storage units and one or more electric devices at differing voltages.

SUMMARY OF THE INVENTION

In at least one embodiment, the invention takes the form of an energy conversion system for a vehicle. The system includes an energy source, or storage unit, an electric device, and an energy conversion arrangement. The arrangement transfers energy between the energy storage unit and the electric device via a first port and a second port. The arrangement also at least one of receives and provides energy via a third port.

DETAILED DESCRIPTION OF EMBODIMENTS OF THE INVENTION

Figure 1:
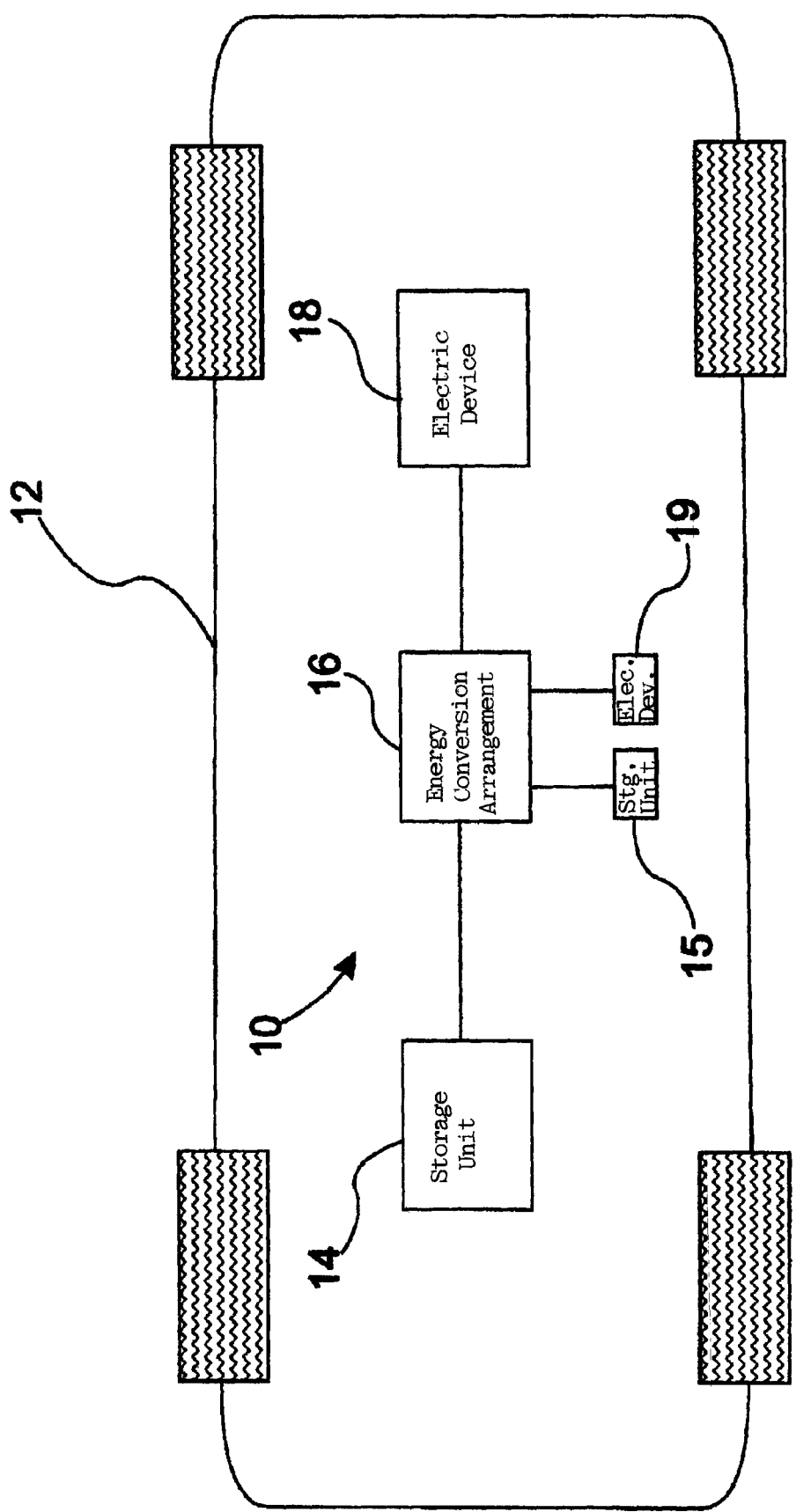
FIG. 1 shows an energy conversion system in accordance with an embodiment of the invention.

FIG. 1 shows energy conversion system 10 for vehicle 12. System 10 includes energy sources, or storage units, 14, 15, energy conversion arrangement 16, and electric devices 18, 19. Arrangement 16 is electrically connected with units 14, 15 and devices 18, 19. Arrangement 16 may receive energy from or provide energy to units 14, 15, as will be explained in detail below. Arrangement 16 may also receive energy from or provide energy to devices 18, 19, as will be explained in detail below.

Figure 2:
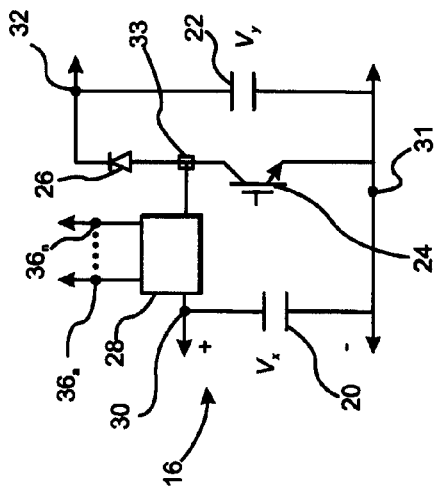
FIG. 2 shows an energy conversion arrangement in accordance with an embodiment of the invention.

FIG. 2 shows an embodiment of arrangement 16. In this embodiment, arrangement 16 receives energy from unit 14 and provides energy to device 18 and acts, inter alia, as a DC/DC boost converter.

Arrangement 16 includes capacitors 20, 22, switch 24, diode 26, and transformer 28 as shown in FIG. 2. Switch 24 is an insulated gate bipolar transistor (IGBT). Switch 24, however, may be implemented in any suitable fashion, such as with field effect transistors (FETs). Transformer 28 may be an isolated transformer or a non-isolated transformer, as will be explained in detail below.

Arrangement 16 also includes terminals 30, 31, 32. Terminal 31 is common relative to terminal 30 and terminal 32. Unit 14, capacitor 20, and transformer 28 are electrically connected with terminal 30. Unit 14 and capacitor 20 are also electrically connected with terminal 31. Terminal 30 and terminal 31 are a port. Device 18 is electrically connected with terminal 31 and terminal 32. Terminal 31 and terminal 32 are a port. The voltage, Vy, at terminal 32 relative to terminal 31 is greater than the voltage, Vx, at terminal 30 relative to terminal 31. Arrangement 16 further includes node 33.

Arrangement 16 passes current between terminal 30 and terminal 32 in a manner typical of DC/DC boost converters through the selective opening and closing of switch 24, e.g., pulse width modulation. When switch 24 is conducting, the current through transformer 28 increases thereby increasing the energy stored in transformer 28. When switch 24 is not conducting, the energy stored in transformer 28 forces diode 26 to conduct thereby delivering current to terminal 32.

Arrangement 16 also includes one or more terminals 36, i.e., 36a-36n. Terminals 36a-36n are electrically connected to transformer 28, as will be explained in detail below. Terminal 36a may be electrically connected with unit 15. Terminal 36b may be electrically connected with device 19. If transformer 28 is a non-isolated transformer, unit 15 and device 19 may share a common reference terminal, e.g., terminal 31. Terminal 31 and any of terminals 36a-36n may be a port. If transformer 28 is an isolated transformer, unit 15 and device 19 may or may not share a common reference terminal. Preferably, unit 15 and device 19 would not share a common reference terminal if transformer 28 is an isolated transformer. Any two of terminals 36a-36n may be a port.

Figure 3:
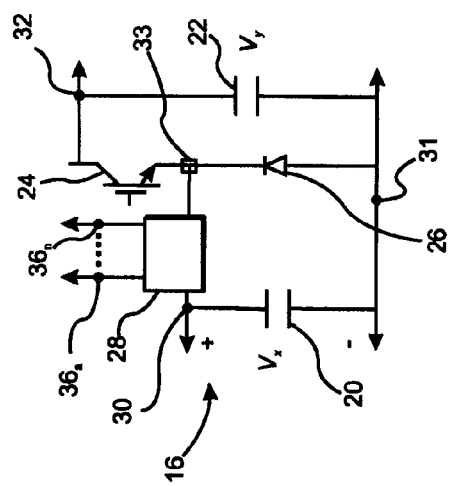
FIG. 3 shows an energy conversion arrangement in accordance with an embodiment of the invention.

FIG. 3 shows an embodiment of arrangement 16. In this embodiment, arrangement 16 receives energy from device 18 and provides energy to unit 14 and acts, inter alia, as a DC/DC buck converter.

Arrangement 16 includes capacitors 20, 22, switch 24, diode 26, and transformer 28. Switch 24 is an IGBT. Switch 24, however, may be implemented in any suitable fashion, such as with FETs. Transformer 28 may be an isolated transformer or a non-isolated transformer as explained above. Arrangement 16 also includes terminals 30, 31, 32. Terminal 31 is common relative to terminal 30 and terminal 32. Unit 14, capacitor 20, and transformer 28 are electrically connected with terminal 30. Unit 14 and capacitor 20 are also electrically connected with terminal 31. Device 18 is electrically connected with terminal 31 and terminal 32. The voltage, Vy, at terminal 32 relative to terminal 31 is greater than the voltage, Vx, at terminal 30 relative to terminal 31. Arrangement 16 further includes node 33.

Arrangement 16 passes current between terminal 30 and terminal 32 in a manner typical of DC/DC buck converters through the selective opening and closing of switch 24, e.g., pulse width modulation. When switch 24 is conducting, current flows from terminal 32 to terminal 30. When switch 24 is not conducting, current flows from terminal 31 to terminal 30.

Arrangement 16 also includes one or more terminals 36, i.e., 36a-36n. Terminals 36 are electrically connected to transformer 28 as will be explained in detail below. Terminal 36a may be electrically connected with unit 15. Terminal 36b may be electrically connected with device 19.

Figure 4:
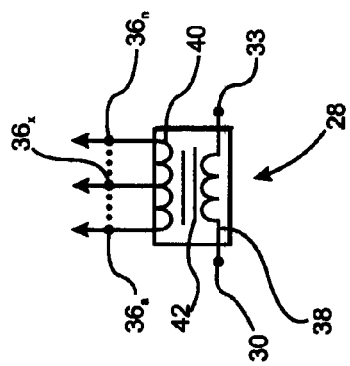
FIG. 4 shows a transformer in accordance with an embodiment of the invention.

FIG. 4 shows an isolated version of transformer 28. This isolated transformer 28 includes primary winding 38 and secondary winding 40, both being wound around magnetic core 42. The transformer 28 may have multiple mutually isolated secondary windings 40. Terminals 36a-36n have voltages with no offset. The amplitude of the voltage difference between terminals 36a and 36x is less than the amplitude of the voltage difference between terminals 36a and 36n. Current coming from any of terminals 36a-36n may be rectified in any suitable fashion, such as with a full-wave rectifier or half-wave rectifier, as will be explained in detail below.

Figure 5:
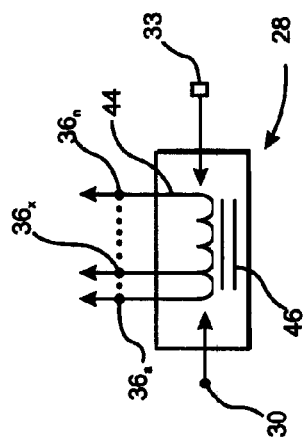
FIG. 5 shows a transformer in accordance with an embodiment of the invention.

FIG. 5 shows a non-isolated version of transformer 28. This non-isolated transformer 28 includes primary winding 44 wound around magnetic core 46. Terminals 36a-36n have voltages, with respect to terminal 31 or any other common reference terminal, with offset. Terminal 30 may be connected with any of terminals 36a-36n. Node 33 may be connected with any of terminals 36a-36n. Terminal 30 and node 33, however, may not be connected to the same terminal. Current coming from any of terminals 36a-36n may be rectified in any suitable fashion, such as with a full-wave rectifier or half-wave rectifier, as will be explained in detail below. This non-isolated transformer 28 may also include isolated secondary windings. Therefore, it may have non-isolated as well as isolated outputs.

Figure 6:
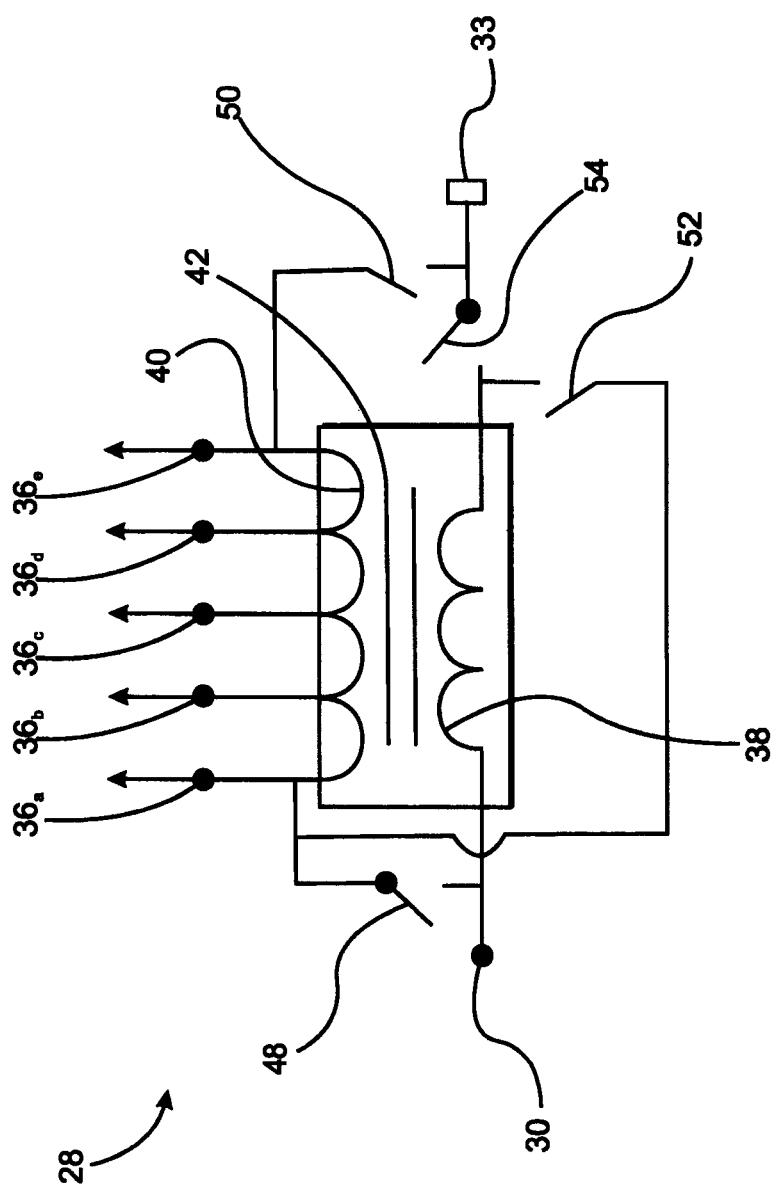
FIG. 6 shows a transformer in accordance with an embodiment of the invention.

FIG. 6 shows an isolated version of transformer 28. Switches 48, 50, 52, and 54 may be selectively opened or closed. If switch 54 is closed and switches 48, 50, and 52 are open, secondary winding 40 is isolated from primary winding 38. It provides power to a load with galvanic isolation with respect to the primary side. If secondary winding 40 is not used, it can be incorporated with primary winding 38 to increase the power rating or inductance. For example, if switches 48, 50, and 54 are closed and switch 52 is open, primary winding 38 and secondary winding 40 are connected in parallel, thus increasing the current rating of transformer 28. If switches 50 and 52 are closed and switches 48 and 54 are open, primary winding 38 and secondary winding 40 are connected in series, thus increasing the inductance of transformer 28. Switches 48, 50, 52, and 54 may be implemented in any suitable fashion. In the embodiment of FIG. 6, switches 48, 50, 52, and 54 are relays.

Figure 7B:
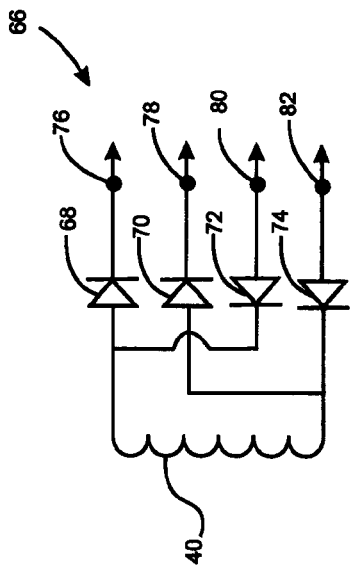
FIGS. 7a-7d show circuits in accordance with embodiments of the invention.
Figure 7A:
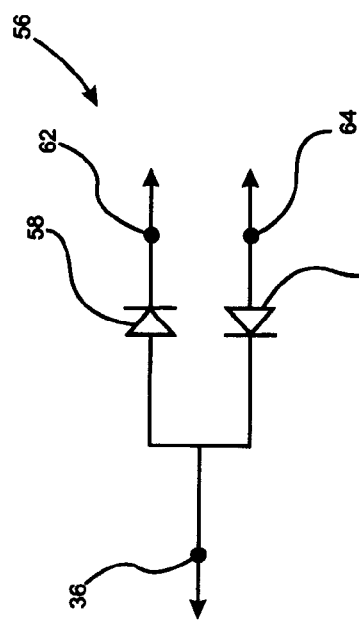

FIG. 7a shows rectifier circuit 56 that may be used with transformer 28. Circuit 56 includes diodes 58, 60 electrically connected, as shown, along with output terminals 62, 64. If the voltage at terminal 36 is greater than the voltage at terminal 62, diode 58 will conduct. If the voltage at terminal 36 is less than the voltage at terminal 64, diode 60 will conduct.

FIG. 7b shows rectifier circuit 66 that may be used in conjunction with transformer 28. Circuit 66 includes diodes 68, 70, 72, and 74 electrically connected as shown. Circuit 66 also includes terminals 76, 78, 80, and 82. Terminal 76 and terminal 82 are a port. Terminal 78 and terminal 80 are another port. The ports do not share a common reference terminal and they deliver two output voltages with different amplitudes.

Figure 7D:
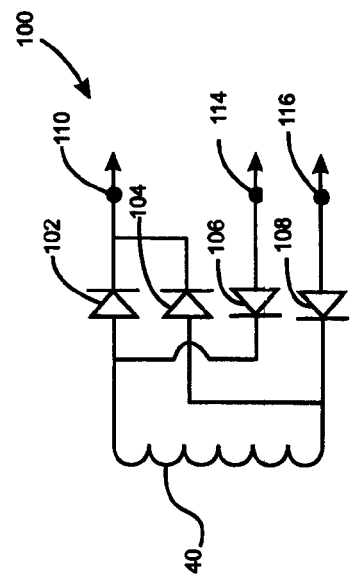
Figure 7C:
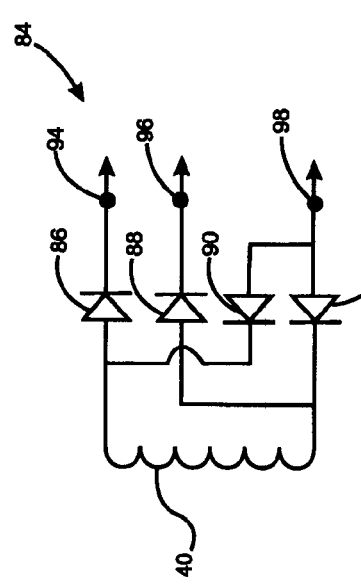

FIG. 7c shows rectifier circuit 84 that may be used in conjunction with transformer 28. Circuit 84 includes diodes 86, 88, 90, and 92 electrically connected as shown. Circuit 84 also includes terminals 94, 96, and 98. Terminal 94 and terminal 98 are a port. Terminal 96 and terminal 98 are another port. The ports share common negative-side reference terminal 98. The outputs of the ports are of the same polarity but may have different output voltage amplitudes.

FIG. 7d shows rectifier circuit 100 that may be used in conjunction with transformer 28. Circuit 100 includes diodes 102, 104, 106, and 108 electrically connected as shown. Circuit 100 also includes terminals 110, 114, and 116. Terminal 114 and terminal 110 are a port. Terminal 116 and terminal 110 are another port. The ports share common positive-side reference terminal 110. The outputs of the ports are of the same polarity but may have different output voltage amplitudes.

Figure 8:
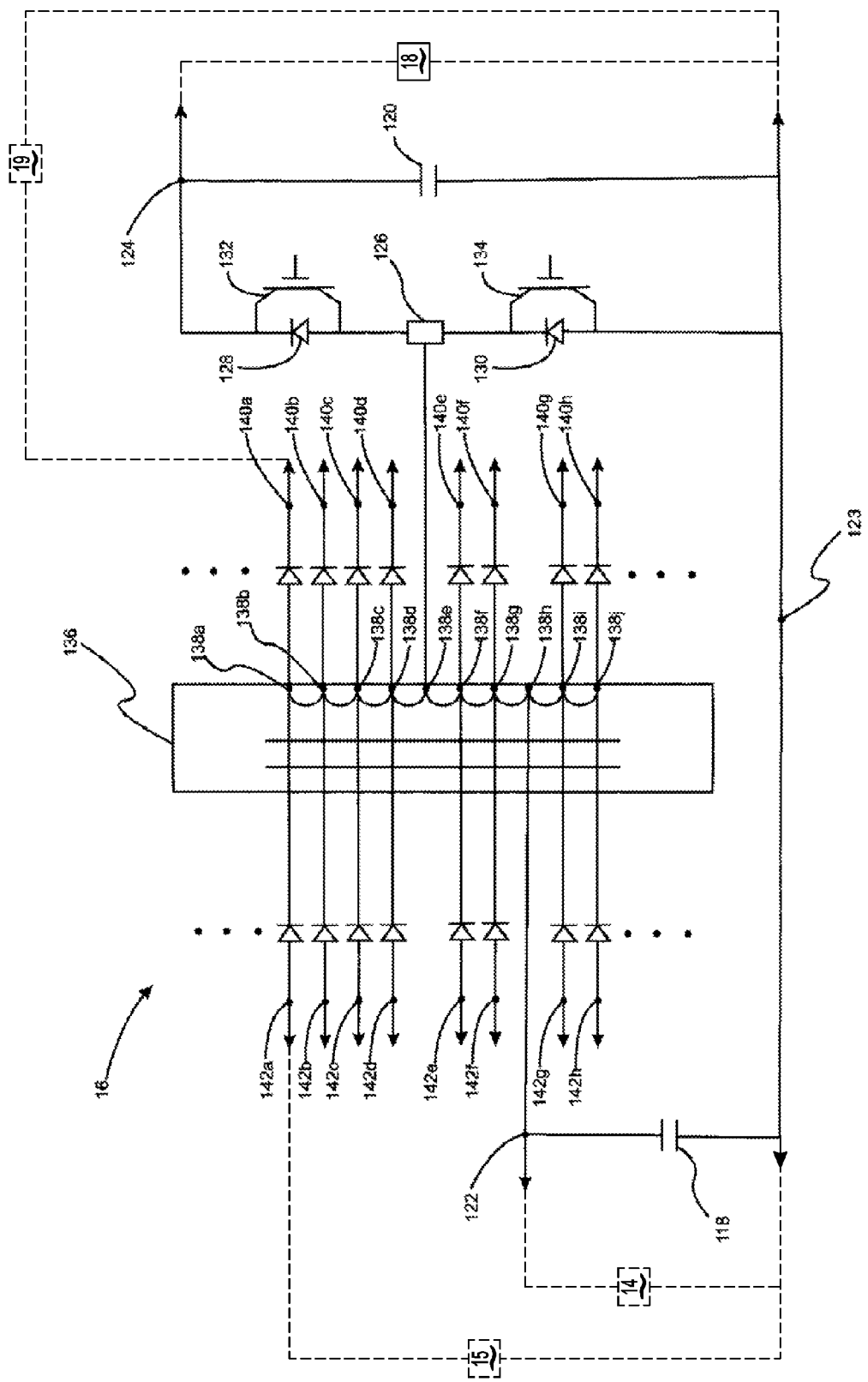
FIG. 8 shows an energy conversion arrangement in accordance with an embodiment of the invention.

FIG. 8 shows an embodiment of arrangement 16. This embodiment includes capacitors 118, 120, terminals 122, 123, 124, node 126, diodes 128, 130, active switches 132, 134, and non-isolated transformer 136. In this configuration, arrangement 16 can act as either a buck or boost converter. If switch 132 is disabled, arrangement 16 acts, inter alia, as a boost converter. If switch 134 is disabled, arrangement 16 acts, inter alia, as a buck converter. The voltage at terminal 122 is less than the voltage at terminal 124 relative to terminal 123.

Non-isolated transformer 136 includes terminals 138, e.g., 138a-138j. Terminals 140, e.g., 140a-140h, and terminals 142, e.g., 142a-142h, are also shown. Other embodiments may have more or less terminals. The diodes may or may not be included.

If arrangement 16 acts as a buck converter, i.e., switch 134 is disabled, the voltage at terminals 142g-142h is less than the voltage at terminal 122, the voltage at terminals 142e-142f is less than the voltage at terminal 122 but greater than zero, and the voltage at terminals 142a-142d is less than zero. Furthermore, the voltage at terminals 140g-140h is greater than the voltage at terminal 122, the voltage at terminals 140e-140f is greater than the voltage at terminal 122 but less than the voltage at terminal 124, and the voltage at terminals 140a-140d is greater than the voltage at terminal 124.

In this configuration, arrangement 16 can receive energy from unit 15 or device 19 if unit 15 or device 19 are suitably electrically connected with any of terminals 142e-142h. Arrangement 16 can provide energy to unit 15 or device 19 if unit 15 or device 19 are suitably electrically connected to any of terminals 140a-140h or 142a-142d.

If arrangement 16 acts as a boost converter, i.e., switch 132 is disabled, the voltage at terminals 142g-142h is less than the voltage at terminal 122, the voltage at terminals 142e-142f is less than the voltage at terminal 122 but greater than zero, and the voltage at terminals 142a-142d is less than zero. Furthermore, the voltage at terminals 140g-140h is greater than the voltage at terminal 122, the voltage at terminals 140e-140f is greater than the voltage at terminal 122 but less than the voltage at terminal 124, and the voltage at terminals 140a-140d is greater than the voltage at terminal 124.

In this configuration, arrangement 16 can receive energy from unit 15 or device 19 if unit 15 or device 19 are suitably electrically connected with any of terminals 142e-142h. Arrangement 16 can provide energy to unit 15 or device 19 if unit 15 or device 19 are suitably electrically connected to any of terminals 140a-140h or 142a-142d.

Figure 9:
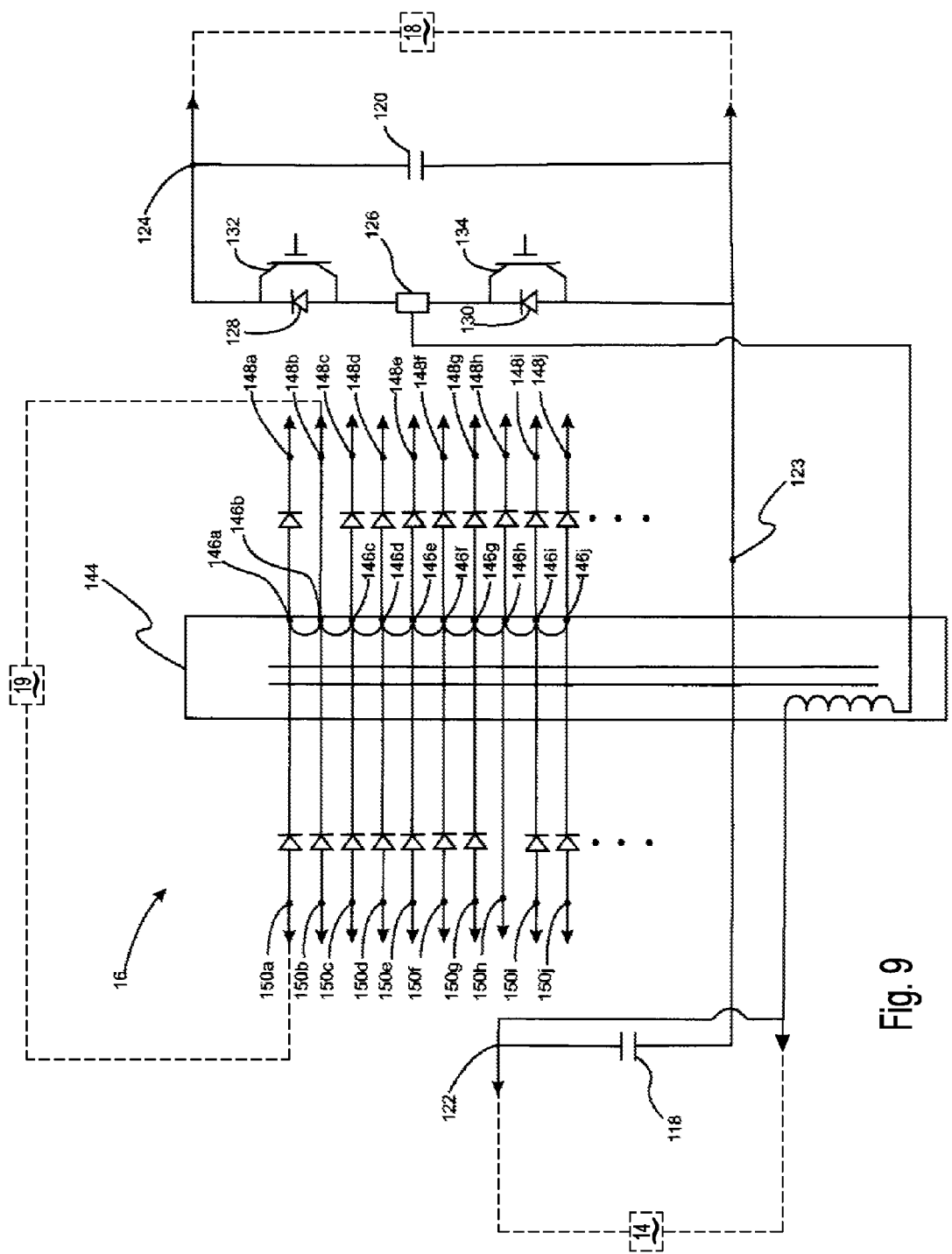
FIG. 9 shows an energy conversion arrangement in accordance with an embodiment of the invention.

FIG. 9 shows an embodiment of arrangement 16. This embodiment includes capacitors 118, 120, terminals 122, 123, 124, node 126, diodes 128, 130, active switches 132, 134, and isolated transformer 144. In this configuration, arrangement 16 can act as either a buck or boost converter. If switch 132 is disabled, arrangement 16 acts, inter alia, as a boost converter. If switch 134 is disabled, arrangement 16 acts, inter alia, as a buck converter. The voltage at terminal 122 is less than the voltage at terminal 124 relative to terminal 123.

Isolated transformer 144 includes terminals 146, e.g., 146a-146j. Terminals 148, e.g., 148a-148j, and terminals 150, e.g., 150a-150j, are also shown. Other embodiments may have more or less terminals. The diodes may or may not be included. The diodes may also be shorted.

In this configuration, arrangement 16 can provide energy to unit 15 or device 19 if unit 15 or device 19 are suitably electrically connected to any of terminals 150a-150j or 148a-148j.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed:

1. A vehicle power system comprising:
   an energy storage unit;
   an electric device; and
   a bi-directional DC-DC power converter electrically connected between the unit and device, and including a non-isolated transformer having a primary winding, a plurality of input ports each tapping the primary winding such that each of the input ports has a DC voltage of a different magnitude, and a plurality of output ports each tapping the primary winding such that each of the output ports has a DC voltage of a different magnitude, wherein a polarity of some of the DC voltages of the input ports is different.

2. The system of claim 1, wherein the non-isolated transformer further has a secondary winding and wherein the converter further includes at least one isolated port tapping the secondary winding.

3. The system of claim 1, wherein the converter is a buck-boost converter.

4. A power system comprising:
   a bi-directional power converter including a non-isolated transformer having a primary winding, a plurality of input ports tapping the primary winding such that the input ports have different DC voltages and polarities, and a plurality of output ports tapping the primary winding such that the output ports have different DC voltages.

5. The system of claim 4, wherein the non-isolated transformer further has a secondary winding and wherein the converter further includes at least one isolated port tapping the secondary winding.

6. The system of claim 4, wherein the converter is a buck-boost converter.

7. A vehicle power system comprising:
   a bi-directional DC-DC buck-boost power converter electrically connected between an energy storage unit and an electric device, and including a non-isolated transformer having a primary winding and a plurality of ports tapping the primary winding such that some of the ports have different voltages with different polarities.

8. The system of claim 7, wherein the non-isolated transformer further has a secondary winding and wherein the converter further includes at least one isolated port tapping the secondary winding 9. The system of claim 7, wherein the some of the ports are input ports.

* * * * *